United States Patent
Hindelang et al.

(10) Patent No.: US 7,873,051 B2
(45) Date of Patent: Jan. 18, 2011

(54) METHOD FOR RECEIVING DATA SENT IN A SEQUENCE IN A MOBILE RADIO SYSTEM WITH RECEPTION GAPS

(75) Inventors: Thomas Hindelang, Fürstenfeldbruck (DE); Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 1084 days.

(21) Appl. No.: 11/579,426

(22) PCT Filed: Apr. 28, 2005

(86) PCT No.: PCT/EP2005/051944

§ 371 (c)(1),
(2), (4) Date: Nov. 2, 2006

(87) PCT Pub. No.: WO2005/109675

PCT Pub. Date: Nov. 17, 2005

(65) Prior Publication Data

US 2007/0218835 A1  Sep. 20, 2007

(30) Foreign Application Priority Data

May 5, 2004  (DE) .................. 10 2004 022 146
Jun. 18, 2004 (DE) .................. 10 2004 029 444

(51) Int. Cl.
*H04L 12/28* (2006.01)

(52) U.S. Cl. ................ 370/394; 370/281; 370/344; 370/331; 455/422.1

(58) Field of Classification Search ................ None
See application file for complete search history.

(56) References Cited

U.S. PATENT DOCUMENTS

| 6,868,075 | B1* | 3/2005 | Narvinger et al. ......... 370/335 |
|---|---|---|---|
| 7,200,136 | B1* | 4/2007 | Raaf et al. ................ 370/349 |
| 2003/0108027 | A1* | 6/2003 | Kim et al. ................. 370/345 |
| 2004/0053614 | A1* | 3/2004 | Il-Gyu et al. .............. 455/436 |
| 2005/0075124 | A1* | 4/2005 | Willenegger et al. ....... 455/522 |
| 2008/0151805 | A1* | 6/2008 | Vayanos et al. ........... 370/312 |

FOREIGN PATENT DOCUMENTS

| CN | 1119057 A2 | 3/1996 |
|---|---|---|
| DE | 199 49 610 A1 | 4/2001 |
| EP | 0 674 455 A1 | 9/1995 |
| EP | 1 039 658 A2 | 9/2000 |
| WO | WO 95/06365 | 3/1995 |

* cited by examiner

*Primary Examiner*—Duc C Ho

(57) ABSTRACT

Methods for receiving data sent by a first emitter of a mobile telephony system to a first resource element of a resource, via a receiver, radiopockets being created during the reception, and data which is not received during the creation of the radiopockets being reconstructed by the receiver are provided. The data which is not received by the first emitter is received by a second emitter, in a temporarally offset manner, on the same resource element of the resource, between the radiopockets, and is used to reconstruct the sequence of data. A conversion is especially advantageous for carrying out a receiving method in UMTS compression mode during the reception of data which is sent continuously independently of the compression mode.

7 Claims, 3 Drawing Sheets

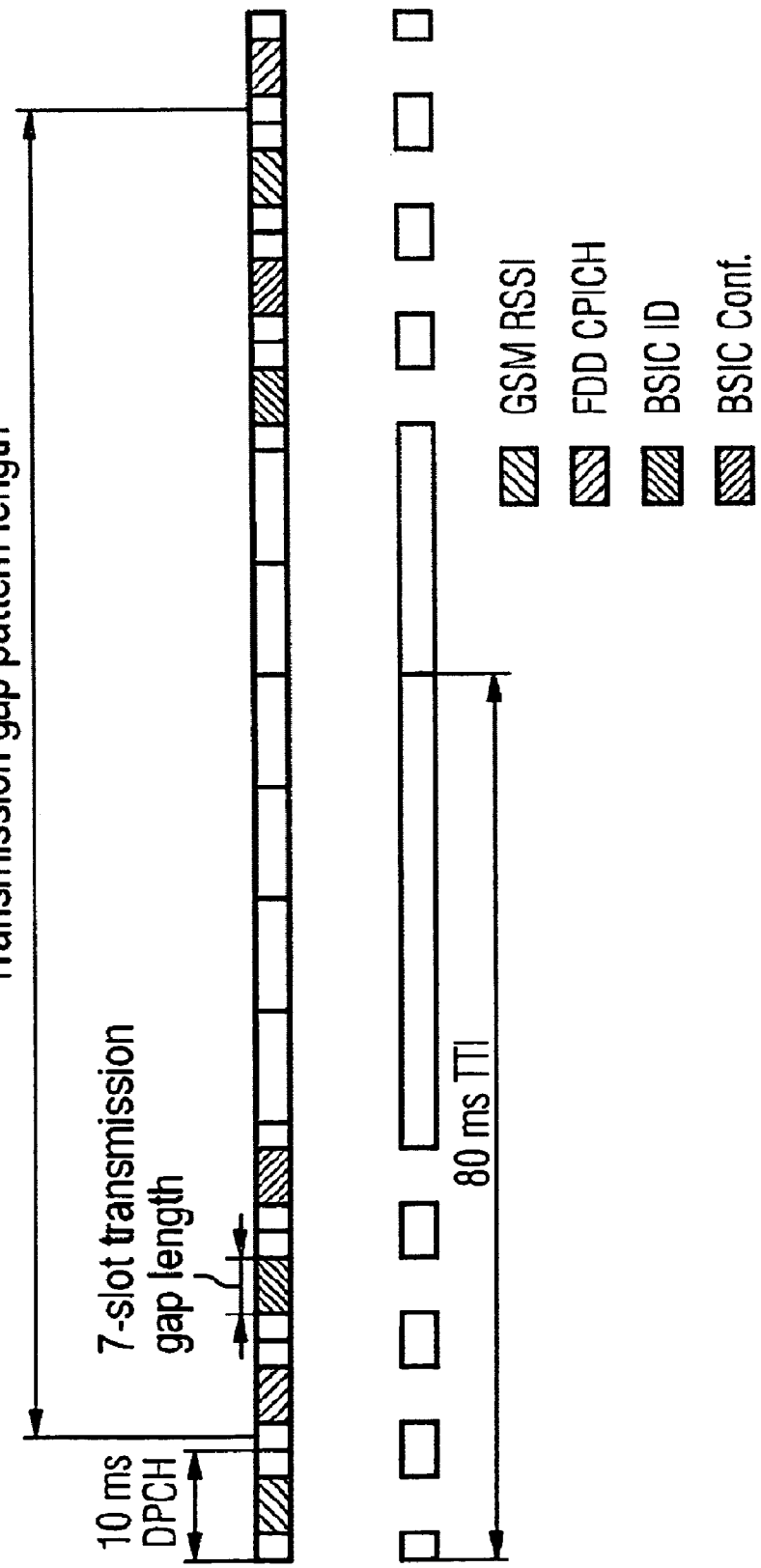

METHOD FOR RECEIVING DATA SENT IN A SEQUENCE IN A MOBILE RADIO SYSTEM WITH RECEPTION GAPS

CROSS REFERENCE TO RELATED APPLICATIONS

This application is the US National Stage of International Application No. PCT/EP2005/051944, filed Apr. 28, 2005 and claims the benefit thereof. The International Application claims the benefits of German application No. 102004022146.4 DE filed May 5, 2004 and German application No. 102004029444.5 DE filed Jun. 18, 2004, all of the applications are incorporated by reference herein in their entirety.

FIELD OF INVENTION

The invention relates to a method for receiving data sent in a sequence in a mobile radio system with reception gaps, to a method for sending a sequence of data from a transmitter to at least one receiver in a mobile radio system of said type, and to a communication system having at least two transmitters.

BACKGROUND OF INVENTION

In a mobile radio system, conforming, for example, to the Universal Mobile Telecommunication System (UMTS) standard, communication connections are set up via radio interfaces between mobile subscriber stations (UE: User Equipment) and stationary base stations (Node B). In order to support the mobility of a subscriber station, the subscriber station must continually carry out measurements with regard to a possible transition (handover) to another base station. These measurements are performed both in an idle state and in a connected state (connected mode). For this reason a mode referred to as compressed mode (CM) was introduced in UMTS in the FDD (Frequency Division Duplex) operating mode in order to enable a subscriber station to perform inter-frequency and inter-RAT (Radio Access Technology) measurements also during an existing connection to a dedicated channel (DCH) even without a second receiving device. With only one receiving device the subscriber station can perform e.g. handover measurements to a GSM radio access network (GSM: Global System for Mobile Telecommunication) during an existing connection. According to the present specification different types of compressed operating modes can be configured by the network. The first operating mode is referred to as "Uplink (UL) in CM only". This operating mode for an uplink connection in compressed mode only is advantageous, for example, if a terminal or, as the case may be, a subscriber station is equipped with a second receiving device, but said subscriber station has to perform measurements in, for example, the GSM 1800 frequency band close to the UMTS frequency band on which an existing connection is being maintained to the first receiving device. In such a case a continuous transmission of the subscriber station on a dedicated UMTS channel (UE UMTS DCH Transmission) would cause strong interference with the GSM measurements which are performed using the second receiving device.

A second operating mode is used in the compressed operating mode for uplink and downlink connections and is referred to as UL/DL CM (DL: Downlink). This operating mode is used in order to be able to avoid the requirement for a second receiving device in the subscriber station and also for a second synthesizer. The third operating mode for downlink connections in compressed mode only, which is referred to as "DL in CM only", can be used if a single receiving station with two synthesizers is used in order to perform, for example, inter-RAT measurements in the GSM 900 frequency band (GSM 900 Inter RAT Measurements).

FIG. 2 illustrates the principle of the compressed operating mode. Data is transmitted via a plurality of frames fr, whereby currently between one and a maximum of seven slots per frame fr can be occupied by the subscriber station for the purpose of performing the measurements. These timeslots can be situated either in the middle of the individual frame fr or be distributed over two frames fr. The transmit power P is increased in the compressed frame frc, thereby maintaining the quality of the connection constant. A compressed frame of this kind therefore consists of compressed data cd and a gap G. During the gap G the subscriber station can perform a measurement on other resources, in particular other frequencies. Which of the frames fr, frc are compressed is decided by the network or, as the case may be, communication system. Compressed frames frc can be specified periodically or also on request. The rate and type of the compressed frames frc are variable and depend, for example, on the type of measurements to be performed by the subscriber station. The structure of the compressed operating mode is assigned to a specific subscriber station, the structures generally being different between different subscriber stations of a plurality of subscriber stations within a cell. In the compressed operating mode data is therefore transmitted by way of frames fr, some of said frames frc having, as compressed frames frc, transmission gaps G in which no data is sent.

Also provided for a communication system of this kind are multimedia broadcast transmissions and what are called multicast services (MBMS: Multimedia Broadcast and Multicast Service), this being a service in which the base stations transmit information of general interest on a commonly used channel. This shared channel is monitored by a plurality of subscriber stations. The general information can be similar, for example, to teletext in television or to the content which is transmitted via DAB (Digital Audio Broadcasting), but also includes services such as multimedia. Such a service can be used, for example, to transmit news of goals in a football match to a plurality of subscriber stations over a single channel. During the transmission over this channel, however, a continuous transmission of data without transmission gaps is planned. During the time of the reception gaps on the receiving station side, no corresponding transmission gaps are provided on the side of the transmitting station with MBMS, with the result that a data loss occurs during the reception gaps.

With the introduction of MBMS for UMTS the problem therefore arises that the physical channel (S-CCPCH) that is used for MBMS does not support the compressed operating mode (CM). In the cases in which a subscriber station is in a dedicated connection state it is clear that at the instants in which the subscriber station performs measurements in the case of a compressed operating mode, data which is transmitted at this time in the corresponding S-CCPCH frames is lost. This results in a loss of MBMS data which is transmitted in continuous sequence over the channel S-CCPCH. In this case the amount of lost data is dependent on the length of the gaps, the frequency of the gaps and the number of active CM sequences in the subscriber station.

FIG. 3 shows an example of data structures such as are received by a subscriber station over a dedicated connection in the compressed operating mode via what is referred to as a DPCH channel (DPCH: Dedicated Connection in CM) in the top illustration. The bottom diagram shows which data is received or, as the case may be, not received by the subscriber station as receiver in the operating mode with reception gaps in the case of the reception of continuous data over such a broadcast channel S-CCPCH during the reception of MBMS. The subscriber station performs various measurements, for example a measurement of the received signal strength of GSM signals (GSM RSSI: Signal Strength Indicator). Further measurements are performed, for example, with regard to a base station identification code BSIC and with regard to inter-FDD frequencies. It is clear that during these measurement times data on the channel S-CCPCH is lost if the subscriber station has only a single receiver device and must therefore change the reception frequency.

A similar problem arises if a subscriber station is in a forward directed access channel state of a cell (Cell FACH (Forward Access Channel) state) in which the subscriber station is assigned a generally specified or a subdivided transport channel in the uplink direction, the random access channel (RACH) for example, which the subscriber station can use for the access procedure at any time. Access to the FACH of the cell is characterized in that the position of the subscriber station is known to the UMTS terrestrial radio access network (UTRAN: UMTS Terrestrial Radio Access Network) at cell level with regard to the cell in which the subscriber station last executed a cell update procedure. In this state no permanently dedicated channel is assigned to the subscriber station and measurements in accordance with the compressed operating mode are not required. Nonetheless the subscriber station must continuously monitor the FACH in the downlink direction and inter-frequency and inter-RAT measurements need to be performed periodically. The duration of the measurement cycle corresponds to the duration of the largest transmission time interval (TTI) on the channel S-CCPCH used for the broadcast messages or, as the case may be, MBMS which can be observed by the subscriber station, the measurement sequences taking place periodically every $2^k$ transmission time intervals, where k=1, 2, 3 for 80 ms TTI conforming to current specifications. In the case of a TTI measurement duration of 80 ms as the longest duration there are measurement periods of 160 ms, 320 ms or 640 ms, according to the choice of k. For illustration purposes FIG. 4 shows an example of a subscriber station in what is referred to as the cell FACH state with k=2. Every 320 ms the subscriber station can interrupt the MBMS reception on the corresponding channel S-CCPCH in case inter-frequency and RAT measurements are required.

A disadvantage with all the methods is that in the case of the compressed operating mode a subscriber station can only incompletely receive continuously and successively sent data on a channel S-CCPCH. Various approaches to solving the problem are currently under discussion. One approach consists in a transmitter with knowledge of the gaps on the receiving subscriber station side simply interrupting the transmission of MBMS data during these times and performing a discontinuous transmission (DTX).

Another approach consists in the subscriber station on the receiver side attempting to reconstruct missing data, for example by performing a decoding using a forward error correction (FEC) technique, e.g. using turbo-decoding and interleaving methods known per se. However, these approaches are problematic, since the measurement gaps of different receiver-side subscriber stations which are located within a cell and receive and MBMS data are not aligned with one another in respect of time. The corresponding structures of the gaps are measurement-specific, i.e. dependent on the type of measurement which is to be performed by a subscriber station, in other words, for example, inter-frequency or inter-RAT measurements, while this also depends, for example, on the position of the subscriber station within the cell.

The preferred approach at the present time is for the subscriber station to perform inter-frequency or inter-RAT measurements during an MBMS reception using discontinuous reception (DRX). In this case the MBMS data is sent and transmitted without interruption, with an individual receiving subscriber station simply losing the MBMS data which was not received during the time that inter-frequency and inter-RAT measurements were being performed. Said subscriber station would have to attempt to reconstruct the missing data through the use of a forward error correction method.

SUMMARY OF INVENTION

An object of the invention is to propose an alternative and preferably improved method for receiving a sequence of sent data during reception gaps in the reception or, alternatively, to propose a correspondingly suitable method for sending a sequence of data, a receiver and a corresponding communication system.

This object is achieved by a method for receiving data sent in a sequence, by a method for sending a sequence of data, by a receiver for a mobile radio system and by mobile radio system devices according to the independent claims.

Accordingly, a method is preferred for receiving, by means of a receiver, data sent in a sequence by a first transmitter of a mobile radio system on a first resource element of a resource, wherein reception gaps occur during the reception and data not received during the reception gaps is reconstructed by the receiver, wherein the data not received from the first transmitter is received offset in time or in scrambled form from a second transmitter on the same resource element of the resource between the reception gaps and used for reconstructing the sequence of data.

Accordingly, alternatively or in combination, a method is preferred for sending a sequence of data from a transmitter to at least one receiver in a mobile radio system via a resource element of a resource, wherein the mobile radio system has a second transmitter with a transmitting area overlapping the transmitting area of the first transmitter, wherein the data is sent with an offset on the same resource element by the second transmitter offset in time or in scrambled form with respect to its transmission via the first transmitter in such a way that data not received on the receiver side due to reception gaps on the resource element during the reception of the data from the first transmitter can be reconstructed.

Accordingly, a receiver for a mobile radio system is preferred having a receiver device for receiving a sequence of data of a transmitter on a resource element of a resource, wherein the receiver device temporarily interrupts the reception on the resource element for the purpose of temporarily changing the resource element, as a result of which reception gaps are produced, with data not received during a reception gap being received from a second transmitter with a time offset and processed in order to reconstruct the sequence of data.

Accordingly, mobile radio system devices of a mobile radio system are preferred having at least two transmitters with at least partially overlapping transmitting areas, wherein the transmitters transmit a sequence of data, wherein the transmitters are embodied for using the same resource element of a resource in each case to transmit the data, wherein one transmitter of the transmitters is embodied to transmit individual data elements or data blocks of the data in each case with an offset with respect to a corresponding data element or data block on or, as the case may be, compared to the other transmitter.

Advantageous embodiments are the subject matter of dependent claims.

A method is particularly preferred wherein a transmit and receive frequency is used as the resource element, in particular a frequency of an FDD or FDMA mobile radio system.

A method is particularly preferred wherein the reception gaps on the receiver side are produced by a temporary changeover of the resource element to another resource element of the resource.

An approach of this kind is also transferable to other data outages, for example if individual data elements or blocks of a sequence of data cannot be received due to interference, such as, for example, in the case of a second receiver device and active measurements in a near frequency band with too high an interference effect. The method can also be implemented in the case of external interferences caused by an external interference source.

A method is particularly preferred wherein the mobile radio system is a communication system having the resource element for sending the sequence of data over a period of time and the at least one receiver interrupts the reception during the period of time temporarily in order to receive on a different resource element and thereby causes the reception gaps.

A method is particularly preferred wherein the order of the data, in particular data blocks during the transmission by the second transmitter, is transposed compared with the order of the data during the transmission via the first transmitter in each case within data blocks with a limited number of elements. A transposition of this kind, i.e. a permutation, can be performed cyclically or randomly in sub-areas.

If the transmitters are synchronized, e.g. within the sectors of a cell, a simple cyclical transposition of data sub-areas, ideally as small as possible, thus prevents the same data being transmitted by a plurality of transmitters at any time and in addition the memory required for resorting the data in the receiving device is small. Furthermore, if data packets with packet numbers for identifying the order are present, a simple reordering can be performed. If merely temporal shifts are performed while the order of the individual data elements remains the same, then it is also possible for the purposes of comparison, by finding a corresponding data element, to perform a cross-correlation between the data sequence with missing data element and the data sequence from the other transmitter.

The shift or, as the case may be, scrambling used by adjacent stations is preferably communicated to the mobile station. This can be done either by means of explicit signaling or is implicitly transmitted by means of another characteristic quantity, e.g. the cell identification ID. For example, the shift used can be calculated from the cell ID modulo a maximum shift value, or the number of the permutation applied for the scrambling can be calculated from the cell ID modulo the number of permutations used.

If, however, the transmitters are not synchronized, it is preferable that no purely cyclical transpositions are performed since in this way it is not possible, in the event of an arbitrary random time shift between two transmitters, to prevent the situation occurring in which the same data is transmitted at the same time by both transmitters. In this case a permutation, in particular a random permutation, of data sub-areas that are as small as possible can be performed, with the result that once again the memory required for the resorting in the receiving device is small.

Such a method is particularly preferred wherein an offset of a data element or data block of the data during the transmission via the second transmitter relative to the transmission of said data element or data block via the first transmitter corresponds to at least twice the duration of the reception gap.

Such a method, such a receiver or such mobile radio system devices are particularly preferred for performing a reception method in the UMTS compression mode method when receiving data sent continuously and without taking the compression mode into account.

Such a method, such a receiver device or such a mobile radio system device are particularly preferred wherein the first and the second transmitter are two sector transmitters of a single transmitting station.

Such a method, such a receiver device or such a mobile radio system device are particularly preferred wherein the offset enables a timely reconstruction, in particular does not exceed the duration of one frame.

Either the offset is zero with regard to e.g. sectors of a cell or completely random. The cyclical transposition relates not to the entire data stream, but only to parts, in particular parts that are as small as possible.

BRIEF DESCRIPTION OF THE DRAWINGS

An exemplary embodiment is explained in more detail below with reference to the drawing, in which:

FIG. 3 shows receiving structures of a receiver in the case of a measurement in compressed mode and application of the compressed mode to continuously sent data;

DETAILED DESCRIPTION OF INVENTION

A selective combining (SC) reception by a subscriber station UE is preferred. For this purpose the same data content, i.e. the same data or data packets, is sent in adjacent sectors and/or cells by more than one base station to a subscriber station. In this case no restrictions are imposed in respect of the synchronization of the data itself. The subscriber station performs inter-frequency or inter-RAT measurements in a known manner in, for example, the compressed operating mode according to UMTS and cannot receive all the data on one MBMS channel. However, the data which was sent and not received during the measurement gaps or, as the case may be, reception gaps is reconstructed. In addition to the possibility of a forward error correction (FEC) mechanism known per se, this is realized in that the data or data packets are sent in adjacent and overlapping sectors and/or cells with an offset or at times that are interleaved with respect to one another. This enables the subscriber station to receive data not received during a reception gap via the same resource at an offset time from an adjacent cell or from an adjacent sector and to use said data for the reconstruction.

Figure 1:
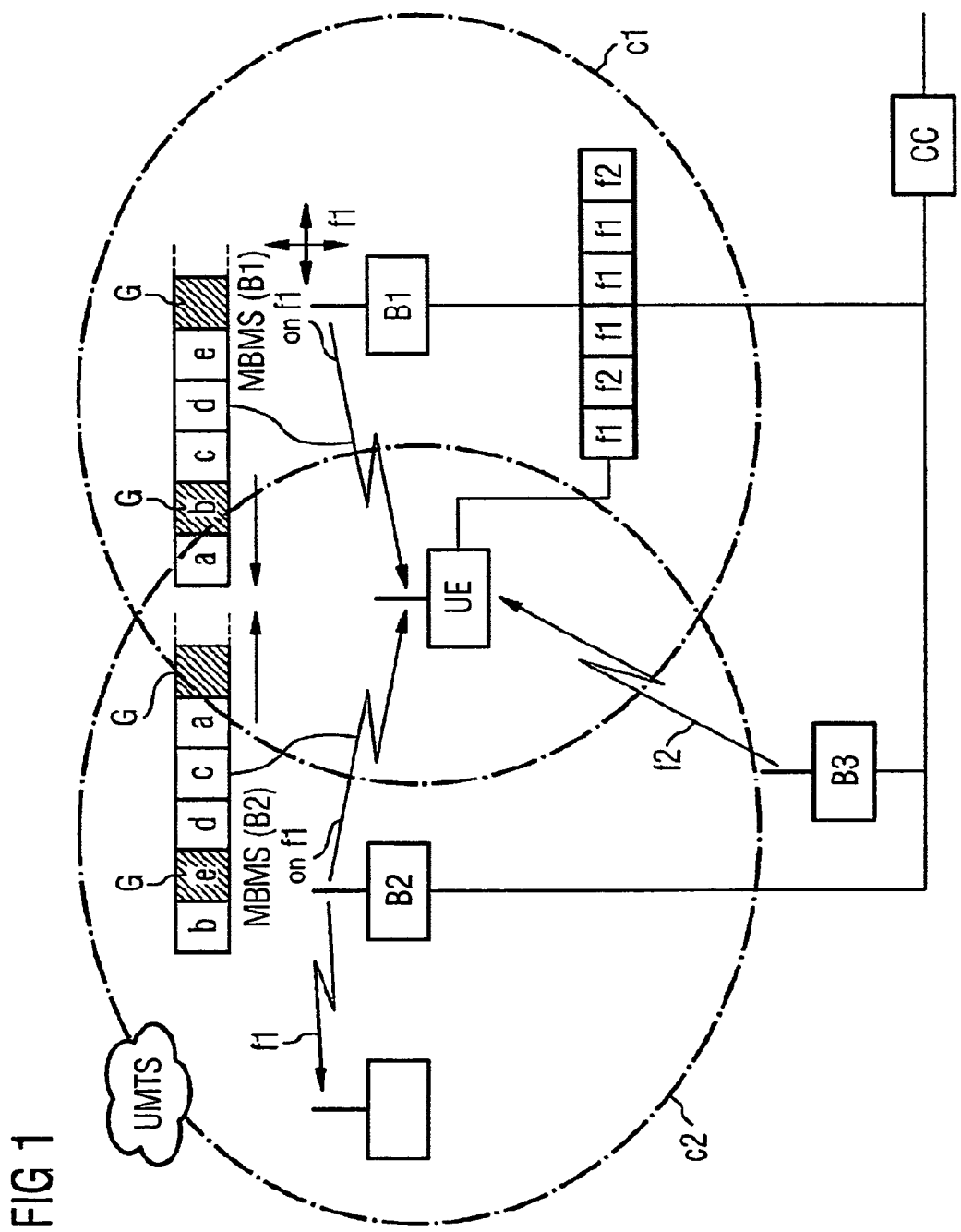
FIG. 1 schematically shows intercommunicating stations of a mobile radio system.
Figure 2:
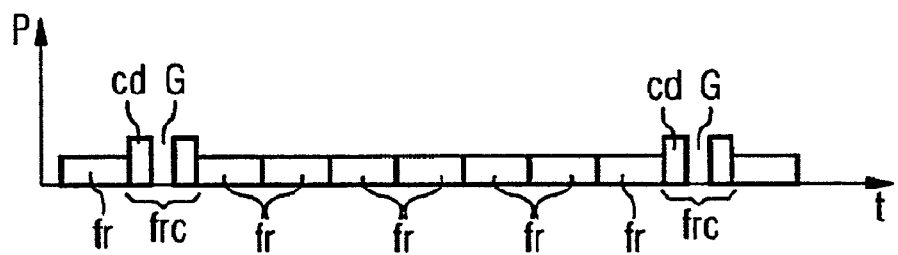
FIG. 2 shows a data structure of a compressed operating mode according to the prior art.
Figure 4:
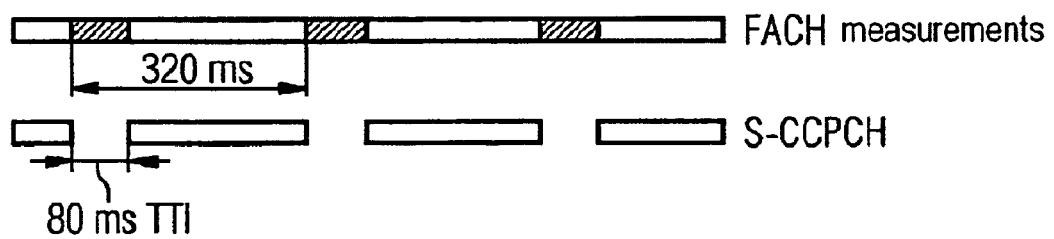
FIG. 4 shows a reception data scheme in the case of a cellular FACH receiving mode.

FIG. 1 shows in schematic form an arrangement of different devices of a mobile radio system, conforming to UMTS for example, as well as data transmitted therein between stations. In principle, however, it is possible to transfer said arrangement to other mobile radio systems and, where applicable, other operating modes with comparable problems. In particular, in addition to the use of two separate base stations B1, B2 each having its own cell c1 and c2 respectively, it is also possible to use a single base station having a sector antenna array and sector cells.

Specifically, three base stations B1, B2, B3 are shown as transmitters by way of example. They are connected to a central control device CC and are controlled centrally with regard to the transmission of data and the setting up of communication connections. In UMTS said central control devices can be the so-called RNCs (Radio Network Controllers).

One subscriber station serves as the receiver UE and is located in the overlapping area of the cells c1 and c2 of the first and second transmitter B1, B2 respectively. A dedicated connection exists between the receiver UE and the first transmitter B1. The receiver UE is in an operating mode in which mainly data on a first frequency as a first resource element f1 of the resource frequency of the FDD method is received from the first transmitter B1. In between times the receiver UE switches for short moments of time to a second resource element f2, i.e. to a second frequency, in order to perform measurements there. During this period of time no data b of a sequence of data a, b, c, d, e can be received which is transmitted over the first frequency f1 by the first transmitter B1. The sequence of data a-e consists of data elements or data blocks which are to be transmitted by the first transmitter B1 over a broadcast channel at the first frequency as resource element f1 to a plurality of subscriber-side receivers UE. The receiver UE is therefore, for example, a subscriber station in the UMTS compressed operating mode, which subscriber station receives MBMS data from the first transmitter B1.

The receiver UE is also located within the radio range of the second transmitter B2. The second transmitter B2 sends the same data of the sequence of data a-e to receiver UE in the area of its cell c2. In order to be able to compensate for the reception gaps at the receiver UE as a result of its operation in the compressed operating mode, the second transmitter B2 sends, on the preferably same resource element f1, i.e. the same first frequency, said data of the sequence of data a-e with a time offset, e.g. scrambled, with respect to the corresponding transmission by the first transmitter B1. As a result there is a high probability that the receiver UE can receive the missing data b from the second transmitter B2 owing to the time scrambling.

The scrambling can be effected in a number of different ways. In addition to a temporally shifted transmission of the individual data elements or data blocks of the sequence of data a-e at a different time by the two transmitters B1, B2, the order during the transmission of the individual data elements or data blocks of the sequence of data a-e can also be transposed. Such a transposition can be performed cyclically or randomly.

In the choice of the offset for the purpose of offset transmission of the data by the second transmitter B2, the duration of the reception gap is preferably taken into account. The offset will be chosen to be proportionally greater than the duration of a reception gap. An offset of at least twice the reception gap is particularly preferred.

In a further embodiment the offset is chosen to be at least as great as to be equivalent to the sum of the reception gap and the current or maximum time shift between two adjacent transmitters. It is then ensured that a reception gap cannot adversely affect the reception of a data packet from both transmitters.

Such an approach is also advantageous with regard to the problems of the transmit power consumption on the part of the transmitters B1, B2 during the sending of data of a sequence of data a-e over MBMS channels in order to reduce the required power. This too is advantageously made possible by the selective choice of data of different transmitters on the part of the receiver UE. The transmission of the sequence of data a-e for the different adjacent and mutually overlapping sectors or cells c1, c2 is coordinated with regard to the content in MBMS by the network, for example the central control device CC. However, the synchronization requirements for the selective combining to be performed in such a way are not very strict compared to the maximum ratio combining in the area of at least some TTIs.

In the case of a coordinated or, as the case may be, synchronous transmission, e.g. within the sectors of a cell, the reconstructability on the part of the receiver UE is advantageously increased by a transposition of the data to be sent in the manner of a pairwise permutation. In the case of such a pairwise permutation, the sequence {a, b, c, d, e, f}, for example, is transmitted by the first transmitter, while the second transmitter B2 transmits the pairwise permuted sequence {b, a, d, c, f, e}. This offers the advantage that only a very small amount of data buffering is required for the reordering on the part of a receiver which regularly receives the data of the second transmitter B2 and must therefore reorder all the received data. Already with simultaneous transmission of a frame containing a plurality of such data elements or, as the case may be, by the other transmitter of a frame containing said data, this data, however, permutated in pairs, this pairwise permutation offers a high degree of security against the loss of a data element or data block on the same S-CCPCH MBMS TTI during an inter-frequency or inter-RAT measurement.

If the transmitters B1, B2 are not coordinated in time with regard to the transmission times, a random permutation of the data elements is advantageous. This ensures that in any event a data reconstruction of the transmitters B1, B2 and a length of 1 MBMS S-CCPCH TTI is made possible if the selective combining during the transmission of the data offset in such a way via two transmitters B1, B2 is received. For example, a permutation can be used wherein the permutated sequence is transmitted by the second transmitter B2. The permutation is performed using the sequence of the first transmitter B1, with four or more data elements or data blocks being permutated among one another in each case. Data element 1 is shifted to position 3, data element 2 to position 4, data element 3 to position 1, and data element 4 to position 2. In order to break up cyclical behavior, elements are additionally permutated between the described groups with four or more data elements.

The scrambling or permutation of the data elements or the delay for the individual transmitters can be performed by the individual transmitters (or components assigned thereto). However, it can also be performed centrally by a central control device CC (for example RNC) for all the transmitters controlled by this control device. The latter alternative has the advantage that this function must be implemented in comparatively few network elements, in particular the memory required for the scrambling or permutation or delay must also only be made available in these elements.

In a further exemplary embodiment it is also possible to specify a set of sequence orders (permutations). At any instant in time each base station is allocated a sequence order from this set, the sequence orders being changed at regular intervals. Advantageously the sequence orders are chosen randomly or pseudo-randomly, i.e. using a pseudorandom number algorithm which makes the choice deterministically as a function of certain parameters, the cell ID and the current frame number, for example. Because adjacent cells randomly select sequence orders it is ensured that irrespective of the time offset of the transmissions a minimum probability is ensured that the transmissions of a data packet from the two cells can be used for the reconstruction. In this case the probability is dependent on the number of sequence orders (at least provided the sequence orders are suitably chosen, as also described further below). With, for example, 4 sequence orders the minimum probability is 75% (since sequence orders which lead to a simultaneous transmission of the data packet in question are chosen only in a quarter of the cases). This method thus leads to a statistical averaging of the collisions and in particular prevents such events occurring continually at specific locations.

This exemplary embodiment has the advantage that the cells do not need to be synchronized in time and also that no coordinated planning has to be carried out for the allocation of sequence orders.

Typically, individual cells in a network are synchronized, e.g. sectors which are radiated from a common location, whereas others are unsynchronized, e.g. sectors at other locations. The method can also be advantageously employed in this case: a common (pseudo-)random number generator is used for the synchronized cells; a cell-specific offset value is then added to the value supplied by said generator, the value range of the random number generator being equal to the number of sequence orders and the addition being performed with the offset value modulo the number of sequence orders. The offset values must be allocated here in such a way that adjacent cells receive different offset values. However, as the number of synchronized cells is typically small in the cited scenario, in particular much smaller than the total number of cells in the network, this allocation is easily and locally plannable. Planning with regard to the unsynchronized cells, more particularly network-wide planning is not necessary. In this way it is ensured that adjacent synchronized cells always use different sequence orders and at the same time a statistical averaging effect as described above occurs with adjacent unsynchronized cells.

In a realistic system there are typically more cells $c_1$, $c_2$ than of two transmitters $B_1$, $B_2$ or, as the case may be, sectors. In order to ensure that the adjacent cells in such a case have different scrambling schemes or permutations, at least four sequence orders are used. According to the known four-color theorem any geographical map can be colored using four colors in such a way that adjacent regions have different colors, which means that sequence orders can also be allocated to the cells such that adjacent cells always use different sequence orders. In this way it is ensured that any subscriber station UE which receives two such adjacent cells can reconstruct missing data.

Such a set of 4 sequence orders containing 4 elements is, for example, the following set (sequence order set 1):

{a,b,c,d},

{d,a,b,c},

{c,d,a,b},

{b,c,d,a}

It can be seen that the elements a to d each occur once per row and column. This is necessary because each data packet must be sent precisely once by each cell (row) and because at any instant in time the data packet is sent by precisely one cell so that it is guaranteed that a UE which receives two cells but cannot receive at one instant can receive the data packet again. If the minimum spacing between the transmissions of the data packets via the different cells should have to be greater so that a reception can be guaranteed, then the criterion that each element only occurs precisely once per column is not adequate. It is therefore clear that a set of sequence orders with a length of 4 can contain no more than 4 sequence orders (more generally, a set of sequence orders with a length n, where the spacing between the transmissions of the data packets via the different cells must be greater than m, can contain a maximum of n/m sequence orders).

This special set of sequence orders has the property that the sequence orders are cyclically transposed with respect to one another. As already described, sets of sequence orders of arbitrary length can be generated easily by cyclical transposition. The maximum number of possible sequence orders per set depends on the length of the sequence orders and the minimum spacing between the transmissions of a data packet on the different cells. By suitable selection of these parameters it is therefore always possible to find a suitable set.

A further set of 4 sequence orders with 4 elements is the following set (sequence order set 2):

{a,b,c,d},

{b,a,d,c},

{c,d,a,b},

{d,c,b,a}

This set is characterized in that the second sequence is the pairwise permutation of the first sequence, and the fourth sequence is the pairwise permutation of the third sequence. As already shown, pairwise permutated sequences have the advantage that only a very small amount of data buffering is required. However, it is not possible to form a set of more than two sequences, with all sequences being pairwise permutated sequences among themselves. To that extent the sequence order set 2 is optimal insofar as it contains at least two pairs of pairwise permutated sequences.

This set can also be described by the following law of formation:

Start with two pairwise permutated sequences of length 2:

{a,b},

{b,a}

Continue the sequences analogously, as a result of which two pairwise permutated sequences of length 4 are produced (other letters are used for the continuation, i.e. c is used instead of a, and d instead of b, in order to obtain unique designations):

{a,b,c,d},

{b,a,d,c}

Append further sequences n, the appended sequences being formed from the existing sequences by transposition of the first and second half (in this case the sequence {c,d,a,b} is produced from {a,b,c,d} because the halves "a,b" and "c,d" are transposed), thereby yielding the sequence order set 2):

{a,b,c,d},

{b,a,d,c},

{c,d,a,b},

{d,c,b,a}

Using this law of formation, sets of sequence orders can be generated whose length is a power of two, e.g. next is the set of length 8:

{a,b,c,d,e,f,g,h},

{b,a,d,c,f,e,h,g},

{c,d,a,b,g,h,e,f},

{d,c,b,a,h,g,f,e},

{e,f,g,h,a,b,c,d},

{f,e,h,g,b,a,d,c},

{g,h,e,f,c,d,a,b},

{h,g,f,e,d,c,b,a}

A further set of 4 sequence orders containing 4 elements, which set likewise contains two pairs of pairwise permutated sequences (and which is therefore also optimal in the above-mentioned sense) is the following set (although this set is somewhat less "elegant" as it is not so symmetrical) (sequence order set 3):

{a,b,c,d},

{b,a,d,c},

{d,c,a,b},

{c,d,b,a}

Disregarding renamings of the elements and row transpositions, there are therefore in total only four sets of 4 sequence orders containing 4 elements, the still missing set being (sequence order set 4):

{a,b,c,d},

{c,a,d,b},

{b,d,a,c},

{d,c,b,a}

All these four sets can preferably be used in mobile radio systems, the sequence order set 2 being characterized in particular as a pair of pairwise transposed sequences and by the symmetrical law of formation, though the sequence order set 3 is equivalent (apart from the law of formation, which is, however, only of secondary importance as regards performance).

The invention claimed is:

1. A method for sending a data set from a second transmitter to a receiver in a mobile radio system, a first transmitter sending a set of data elements in a first sequence to the receiver via a resource element of a resource, a first element of the data set not received on the receiver side due to a reception gap during the reception of the data set, the method comprising:

sending the data set by the second transmitter on the same resource element so that a second element not received on the receiver side due to a reception gap during a reception of the data set from the second transmitter is not the same as the first element wherein the order of the elements in the data set sent by the second transmitter is different than the order of the elements in the data set sent by the first transmitter, and wherein the order of the data elements is transposed during the transmission by the second transmitter with respect to the order of the data elements during the transmission via the first transmitter in each case a limited number of elements is transmitted.

2. The method as claimed in claim 1, wherein the limited number of elements is four and in each case a set of no more than four sequence orders is used in the mobile radio system.

3. The method as claimed in claim 2, wherein the set of four sequence orders is:

{a,b,c,d},{b,a,d,c},{c,d,a,b},{d,c,b,a} or
{a,b,c,d},{b,a,d,c},{d,c,a,b},{c,d,b,a} or
{a,b,c,d},{c,a,d,b},{b,d,a,c},{d,c,b,a} or
{a,b,c,d}, {d,a,b,c}, {c,d,a,b}, {b,c,d,a}.

4. The method as claimed in claim 1, wherein the data set sent by the second transmitter is sent with a time offset with respect to the transmission via the first transmitter.

5. The method as claimed in claim 4, wherein the offset of a data element during the transmission via the second transmitter with respect to the transmission of the data element via the first transmitter corresponds to:

at least twice a duration of the reception gap or a sum of a duration of the reception gap and the current or maximum time shift between the transmitters.

6. The method as claimed in claim 1, wherein the mobile radio system is a communication system with the resource element for sending the data sets over a period of time and the receiver temporarily interrupts the reception during the period of time for the purpose of receiving on another resource element and thereby causes the reception gaps.

7. A mobile radio system, comprising:

a set of data elements, a mobile subscriber station comprising a receiver and located in a first area;

a first transmitter transmits the set of data elements arranged in a first sequence order to the receiver in the first area; and a second transmitter transmits the set of data elements arranged in a second sequence order to the receiver in the first area;

wherein the arrangement of the first order is different from the arrangement of the second order, and wherein the first area is an overlap in transmission areas for the first and second transmitters;

a first set of data elements and a second set of data elements received by the receiver in the first area, the first set of data elements arranged in the first sequence order and includes a reception gap such that an element of the set of data elements is missing, the second set of data elements arranged in the second sequence order, and a third set of data elements constructed from the first set of data elements by replacing the missing data element using the second received set of data elements.

* * * * *